United States Patent [19]
Leggett et al.

[11] Patent Number: 6,098,142
[45] Date of Patent: Aug. 1, 2000

[54] APPARATUS AND METHOD FOR USING A COMMUNICATIONS PORT IN POLLING MODE AND WITHOUT INTERRUPTS

[76] Inventors: John D. Leggett, 16 Puffer Rd., Canterbury, N.H. 03224; Keith A. Wright, 22 Woodcrest Heights Dr., Concord, N.H. 03301

[21] Appl. No.: 09/140,074

[22] Filed: Aug. 25, 1998

[51] Int. Cl.$^7$ .............................. G06F 13/00; G06F 1/26
[52] U.S. Cl. ............................. 710/220; 710/46; 713/300
[58] Field of Search ............................. 713/300; 710/63, 710/220, 46, 105, 129, 52; 375/214; 370/346, 449; 709/107

[56] References Cited

U.S. PATENT DOCUMENTS

| | | |
|---|---|---|
| 4,380,063 | 4/1983 | Janson et al. . |
| 4,751,634 | 6/1988 | Burrus, Jr. et al. . |
| 5,222,062 | 6/1993 | Sharma et al. . |
| 5,247,671 | 9/1993 | Adkins et al. . |
| 5,557,633 | 9/1996 | Staab et al. . |
| 5,634,074 | 5/1997 | Devon et al. . |
| 5,668,716 | 9/1997 | Otomo . |

OTHER PUBLICATIONS

"Use RS–232C Port To Measure Pressure", W. Stephen Woodward, EDN Magazine, Aug. 1, 1997, p 104.
"Transistor Forms RS–232C Digital Thermometer", W.S. Woodward, EDN Magazine, May 9, 1996, p 92.
"RS–232 Port Powers Frequency Counter", Maxim Integrated Products, Electronic Design, Feb. 9, 1998, p. 132.

*Primary Examiner*—Gopal C. Ray
*Attorney, Agent, or Firm*—Robert R. DeLeault, Esq.; Mesmer Law Offices, P.A.

[57] ABSTRACT

A communications port adapter and method for using a communications port of a host computer in polling mode and without interrupts. The communications port adapter includes at least a converter circuit for converting an input signal from a measuring device to frequency, a switching component connected to an output of the converter circuit for transmitting a frequency output signal, and a counter circuit having an input connected to the switching component for receiving the frequency output signal of the converter circuit and an ouput coupled to the communications port of the host computer.

26 Claims, 6 Drawing Sheets

APPARATUS AND METHOD FOR USING A COMMUNICATIONS PORT IN POLLING MODE AND WITHOUT INTERRUPTS

BACKGROUND OF THE INVENTION

1. Field of the Invention

The present invention relates to a communication system using a communications port. Particularly, the present invention relates to a communication system using a communications port without interrupts. More particularly, the present invention relates to a communication system using a serial communications port in polling mode and without system interrupts in an operating system where available interrupts are already used by other applications. Even more particularly, the present invention relates to a multitasking computer system using a serial communications port in polling mode and without system interrupts in an operating system where available interrupts are already used by other applications.

2. Description of the Prior Art

Since the advent of the computer, computers have been used for data collection and analysis. Communications between computers and peripherals are extremely important to modern computer systems. Today, measuring and observing devices and many other controllers perform a variety of control operations based on microcomputers. Some computers have several independent serial communications ports which operate simultaneously. Peripheral devices attached to the serial communications ports are operated by receiving and transferring the data between the devices and the computer. In the great majority of cases, serial communications are conducted by the use of a serial port configured to the RS-232C standards. In this type of serial communication, there is a one-to-one correspondence between the input and output terminals of a device and the computer for receiving and transferring data.

Current systems are primarily concerned with using priority or multiplexing schemes. These systems require the use of system interrupts to schedule data transfer at given time intervals. In addition, there are methods of using parallel ports (printer ports) in various ways for data acquisition. There are also methods for having a device count for a period of time, but they also rely on using system interrupts. Most data acquisition systems are dedicated systems so that the system can be customized to a particular set of tasks.

U.S. Pat. No. 5,668,716 (1997, Otomo) teaches a controller which performs two-way serial communications between a plurality of devices at one time through a reduced number of data communication lines by use of a serial communication line and serial port adapter connected to a CPU and an external device. The controller includes the CPU, a serial communication device constituting the adapter, and a discriminator. This device connects the various devices in a "daisy chain" scheme. Unlike the Otomo device, the present invention uses a dedicated serial port in polling mode. The present invention also allows other ports to use the available communication port interrupts.

U.S. Pat. No. 5,247,671 (1993, Adkins et al.) teaches a serial communication adapter providing an interface to physical communication ports. A scheduler executing on the adapter schedules tasks at different priority levels, so that time-critical tasks are performed quickly enough to prevent data loss. This device uses various hardware interrupts generated by the system and communications ports to schedule tasks. This device uses priority coding to select the interrupt to be processed. Unlike the Adkins device, the present invention requires neither interrupts nor priority encoding. The present invention operates in polling mode.

In present PC multitasking systems (such as the operating system for Windows 95®) there are four serial ports available (COM1 through COM4) but only two interrupt lines (IRQ's). This is a hardware constraint. Updating to a new operating system will not easily change this. Moreover, the time resolution conveniently available in these systems is only 55 milliseconds (ms). There is not a readily available time base without reconfiguring the programmable interval timer, a risky and nontrivial task. In a multitasking environment, an application has no way of knowing when it will have another turn if a system interrupt occurs. These considerations make it difficult to measure either time intervals or frequencies accurately. The best one could do is to use a serial port interrupt and then measure the time ±55 ms. However, when another application has seized two serial ports, the interrupt is not available. For example, when using a modem to connect to the Internet and using the mouse (unless it is PS2) there are no interrupts available.

Therefore, what is needed is an apparatus that uses a serial communications port without interrupts. What is further needed is an apparatus that uses a serial communications port in polling mode and without interrupts. What is still further needed is an apparatus that uses a serial communications port in polling mode and without interrupts on computer systems which perform arbitrary tasks and is not a dedicated system customized to a particular set of tasks. Yet, what is still further needed is an apparatus that uses a serial communications port in polling mode and without interrupts, and that uses a known time base generated by the computer to produce a pulse which enables a counter to count only during prescribed, active times under program control.

SUMMARY OF THE INVENTION

It is an object of the present invention to provide an apparatus that uses a serial communications port of a computer without interrupts. It is another object of the present invention to provide an apparatus that uses a serial communications port of a computer in polling mode and without system interrupts. It is yet another object of the present invention to provide an apparatus that uses a serial communications port of a computer in polling mode and without system interrupts on computer systems which perform arbitrary tasks and is not a dedicated system customized to a particular set of tasks. It is a further object of the present invention to provide an apparatus that uses a serial communications port of a computer in polling mode and without interrupts, and that uses a known time base generated by the computer to produce a pulse which enables a counter to count only during prescribed, active times under process control.

The present invention is an apparatus and process to use a known time, the pulse width of the serial port output. The key is to build the external hardware to utilize this time. The external hardware enables the process, but the process does not control the time. It is the width of the TX pulse which controls the time that the process takes place. Further, the process is enabled during the time that the pulse is active and suspends the process at all other times. In this way the process controls the time rather than measures it, and thus allows use of the serial communications port in polling mode.

The apparatus of the present invention includes a voltage regulator power circuit, a converter circuit, a counter circuit, a calibration and measuring circuit, and a logic-level shifter circuit. The computer repetitively triggers the process through the TX line of the serial port. The voltage regulator power circuit provides constant drive to the remaining circuits of the present invention. The converter circuit converts measurement values received from the calibration and measuring circuit to frequency. Depending on the converter chosen for use in the present invention, the converter circuit converts values such as voltage, current and the like, received from attached measuring devices. The calibration and measuring circuit does not include the measuring probes attached to the present invention. It is obvious to those skilled in the art that the calibration and measuring circuit may be one of a number of different circuits which are generally known and used in the art. For example, circuits have been designed to measure temperature, pressure, wind speed, motion, and the like. Circuits for amperometric and potentiometric measurements, both for low impedance and high impedance measuring devices, may also be used. Some of these circuits include at least one operational amplifier in conjunction with various resistors, diodes, capacitors, and the like, in an arrangement designed for a particular measurement application.

The frequency output of the converter circuit is outputted to the clock lead of the counter circuit through a gate that is activated by the TX pulse sent by the computer. It is understood by those skilled in the art that any other electronic or electromechanical device which can act as a switch to transmit the output from the converter circuit to the counter circuit may be used in place of the gate. The counter circuit divides down the frequency output received from the converter circuit for each TX pulse received from the computer. This "dividing down" of the frequency is performed by a relatively long counter in the counter circuit. The computer, at unknown intervals, provides pulses and then later looks for a change in the control lead. If no change has occurred, another pulse is provided, again at a time which is irrelevant because the process is suspended in between pulses. As the TX pulses continue, the application software counts the number of TX pulses sent until the counter in the counter circuit is full. When the counter is full, it triggers a status change in the counter's logic output. This status change is adjusted by the logic-level shifter circuit and detected by the computer through the serial port. When the status change is detected, the total count of the TX pulses is converted and corrected to the proper measuring probe value and saved to a data file. For instance, in the case of temperature probes, the value may be a corresponding value in the range of about −40° F. to about 140° F. When the logic shift occurs, the counter in the counter circuit is reset to 0 and following the conversion of the total TX pulse count, the TX pulse count is reset to zero.

The process of the present invention begins by initializing the adapter (hardware) of the present invention. The initialization cycle is started by selecting a calibration standard through the Data Set Ready (DSR—pin 20 of a commercial DB-25 serial connector), getting the status of the Carrier Detect (CD—pin 8) and storing CD status in memory. The calibration standard may be a simple calibration resistor matched for the type of measuring probe used and is pre-set. Transmit pulses (TX pulses—pin 2) are applied until the status of CD changes. The pulse width depends on the particular pulse chosen and is equal to one divided by the baud rate times the pulse chosen (nine: 1 start bit, etc.). When the status of CD changes, the process sets the count of the counter circuit and the TX pulse counter in the application program to zero. The initialization cycle is followed by the calibration cycle and the TX pulses are continued. For each TX pulse transmitted, the status of CD is checked. The TX pulses continue and the count increases by 1 until the status of CD changes. When the CD status changes, the total count of the TX pulse counter is compared to a table of pre-set values stored in a temperature compensation table and translated into a correction factor. The pre-set temperature compensation table is specific for the type of measuring probe used and compensates for shifts in the present invention's overall circuit output based on the circuit's operating temperature and component aging. The correction factor is stored in memory and used in a polynomial expression (specific for the type of measuring probe used) to calculate corrected values for the measuring probe's output.

Once the correction factor is determined, one of a plurality of measuring probes is initially chosen and the measurement cycle is begun. The counter in the counter circuit and the TX pulse counter are reset to zero and a TX pulse is transmitted. As was done during the calibration cycle, the status of CD is checked after each TX pulse. The sending of TX pulses continues as long as the computer can send them (i.e. the serial communications port is available) and until the status of CD changes. When TX goes low, the counter holds the count until TX goes high again, at which point the count resumes. Upon CD status change, the total count value of the TX pulse counter is translated into a measurement value of the measuring probe. For instance when a temperature probe is used, the count value is translated into a temperature value. The previously determined correction factor is applied to the measurement value generating a corrected value. The corrected value is stored in the computer's memory and may be displayed on the computer screen, saved to a file and printed.

DETAILED DESCRIPTION OF THE PREFERRED EMBODIMENT

Figure 1:
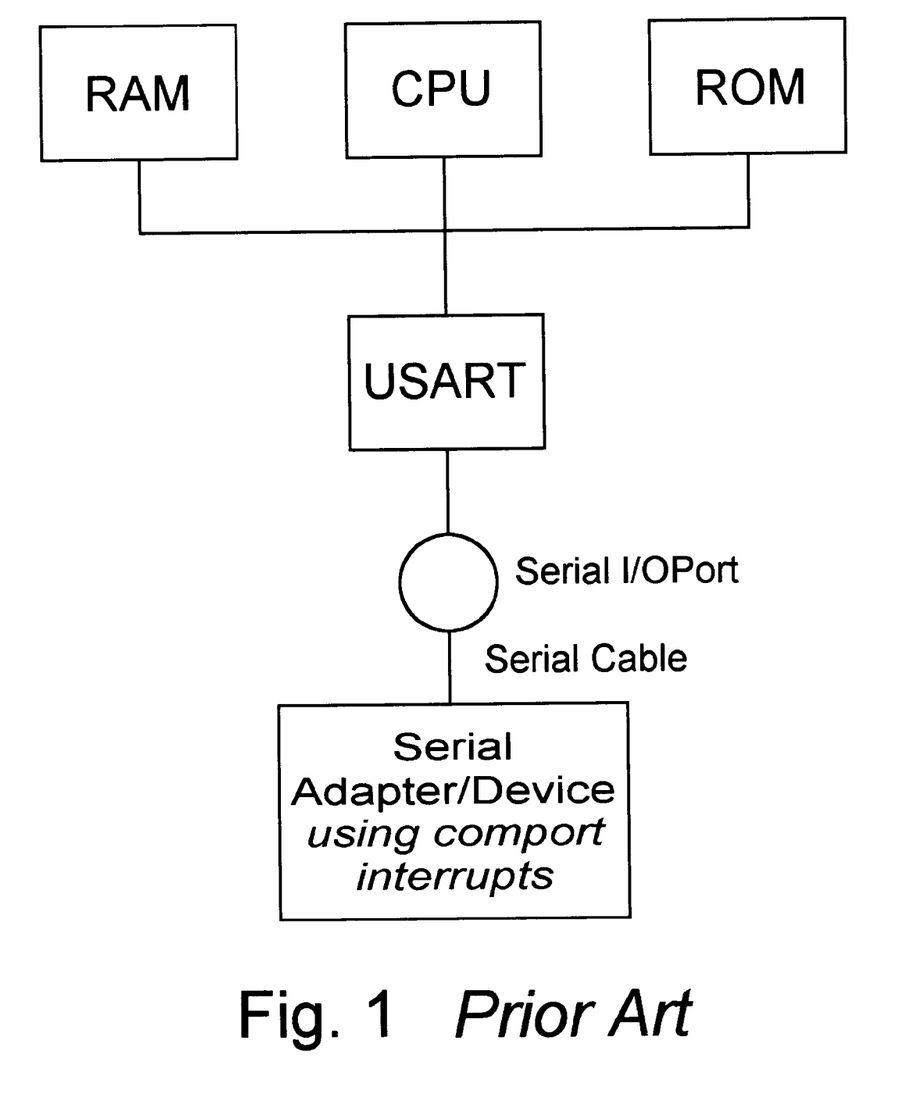
FIG. 1 is a simplified block diagram of a computer system in which the present invention may be used.

The preferred embodiment of the present invention is illustrated in FIGS. 1–5. The computer system of FIG. 1 is exemplary of a wide variety of multitasking computer systems in which serially-connected devices may be found and in which the present invention may be used to advantage. An address bus and a data bus connect a central processing unit (CPU) to read-only memory (ROM), and through bus transceivers, to random-access memory (RAM) and to a UART (universal asynchronous receiver transmitter) or a USART (universal synchronous/asynchronous receiver transmitter) that provides an interface to the serial I/O ports.

Embodiments of a serial communications adapter for use in polling mode and without interrupts according to the present invention will be discussed as applied to an adapter for measuring temperature.

Figure 2:
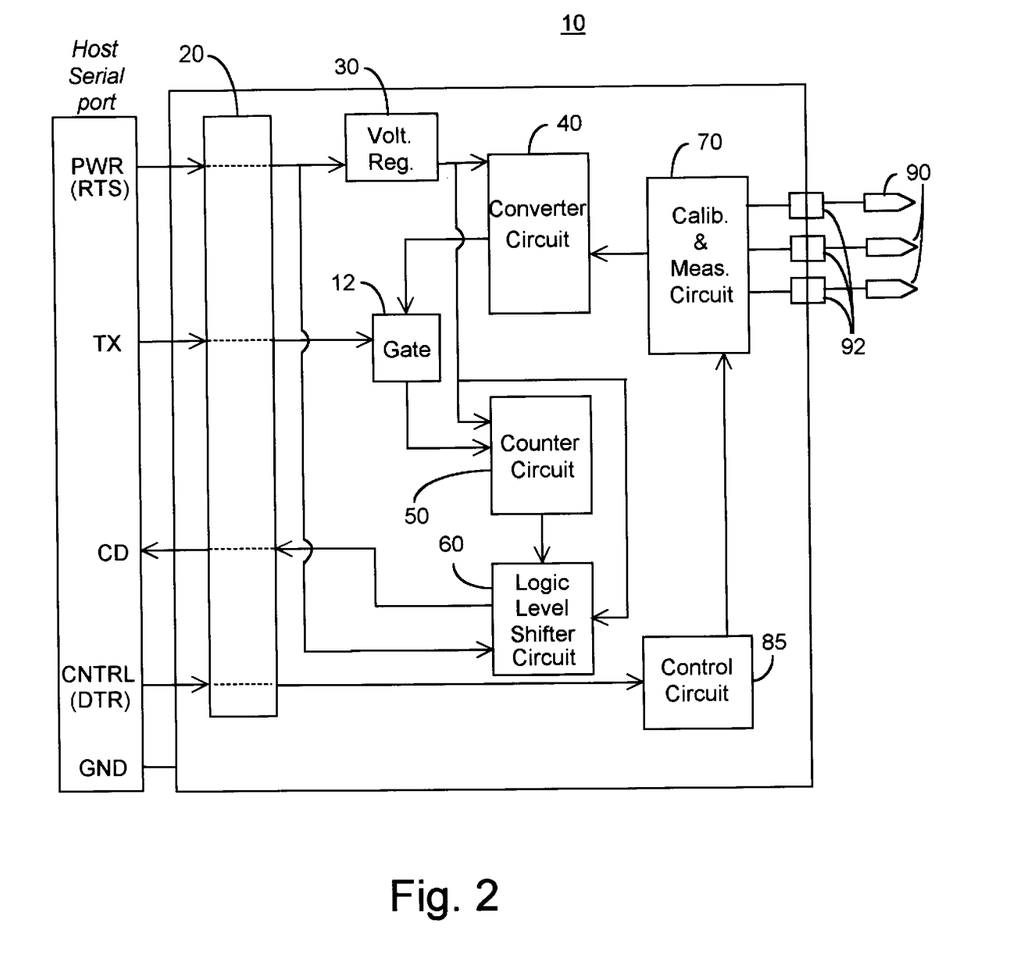
FIG. 2 is a block diagram of an example of a possible communications device/adapter that may be used in the computer system.

A temperature measuring adapter 10 in FIG. 2 includes a serial port interface 20, a power regulator circuit 30, a converter circuit 40, a counter circuit 50, a logic-level shifter circuit 60, a calibration and measurement circuit 70, and a control circuit 85. The serial port interface is based on, e.g., the RS232C standards. An example of an acceptable serial port interface is a commercial DB 25 pin connector. A mini-DB 9 pin connector may also be used. A plurality of temperature sensing probes 90 are shown connected to the calibration and measuring circuit 70 by way of a plurality of input ports 92. Connected to the serial port interface are a corresponding data output terminal (TX signal) defined as a serial data output port of the host computer's serial port, a data ready-to-send terminal (RTS terminal), a data carrier detect terminal (CD signal), a control terminal also known as the data terminal ready terminal (DTR signal), and a ground terminal (GND). There are also two other terminal connections used in a second embodiment of the present invention. One of the connections is used to power a user operated temperature probe selection and to remotely select a particular temperature measuring probe.

Figure 3:
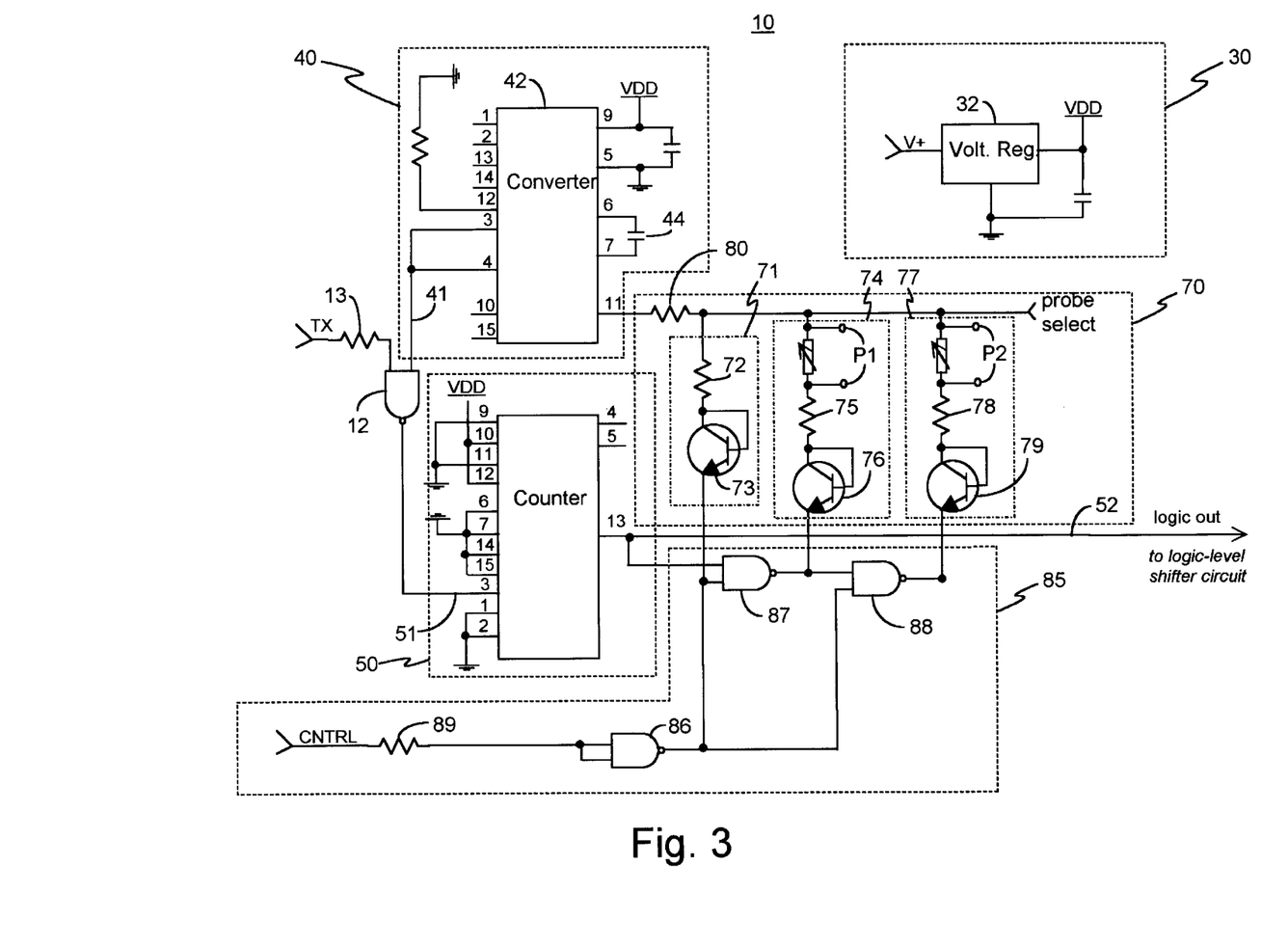
FIGS. 3 and 3A is a circuit diagram illustrating an adapter for the preferred adapter system.

Referring now to FIG. 3, power (V+) from the host computer is supplied to adapter 10 through the RTS terminal of serial port interface 20. Power regulator circuit 30 includes a voltage regulator 32 for receiving V+ from the host computer and supplying a constant +5 volts (VDD) to drive converter circuit 40, counter circuit 50, and one side of the logic-level shifter circuit 60. A device suitable for use as the voltage regulator 32 is available as model LM2931AZ-5.0 Voltage Regulator from Motorola, Inc., Semiconductor Sector, Phoenix, Ariz. Converter circuit 40 includes a phase locked loop 42 (PLL) which is operated as a voltage controlled oscillator with fixed voltage input, and a capacitor 44. A device suitable for use as the phase locked loop 42 is available as model MC14046BCP Phase Locked Loop from Motorola, Inc., Semiconductor Sector, Phoenix, Ariz. The input signal received from the calibration and measurement circuit 70 is converted to frequency. The frequency generated by converter circuit 40 depends on the capacitor 44 and the resistance of the path to ground on pin 11 of phase locked loop 42. The resistance is formed by protective resistors 80, 75 and 78 together with a thermistor that detects the temperature connected at first probe input P1 and/or second probe input P2 of calibration and measuring circuit 70. Thus the phase locked loop 42 is used as a temperature dependent oscillator.

The resulting oscillator frequency output signal from converter output lead 41 of converter circuit 40 is gated to the counter circuit 50 by gate 12. Counter circuit 50 generally includes an input terminal illustrated as clock lead 61 and a logic output terminal 52. A device suitable for use as the counter circuit 50 is available as model MC14536BCP CMOS Programmable Timer from Motorola, Inc., Semiconductor Sector, Phoenix, Ariz. When the TX signal from the computer goes high, the output from gate 12 goes active and passes the oscillator frequency output signal to the clock lead 51 of counter circuit 50. Although a NAND gate is shown as gate 12, it is understood that any type of device (electronic and electromechanical) that can act as a switch an allow the signal from the converter circuit 40 to be received by the counter circuit 50 when the switch is activated, can be used in place of gate 12. Resistor 13 is connected between the TX terminal and gate 12 to buffer the larger signal swing of the TX signal. The counter circuit 50 is set to divide down the frequency by $2^{19}$. The counter circuit 50 counts as long as TX is high. When TX goes low, the counter circuit 50 holds the count until TX goes high again. When TX goes high again, the counting resumes. When the counter circuit 50 reaches the full count of $2^{19}$, its output changes logic state from 0 to 1 or 1 to 0, depending on its status prior to reaching the full count. Typically, the logic output voltage of counter circuit 50 is typically +5 volts or 0 volts. The logic output voltage of counter circuit 50 is transmitted to logic-level shifter circuit 60 and control circuit 85.

Figure 3A:
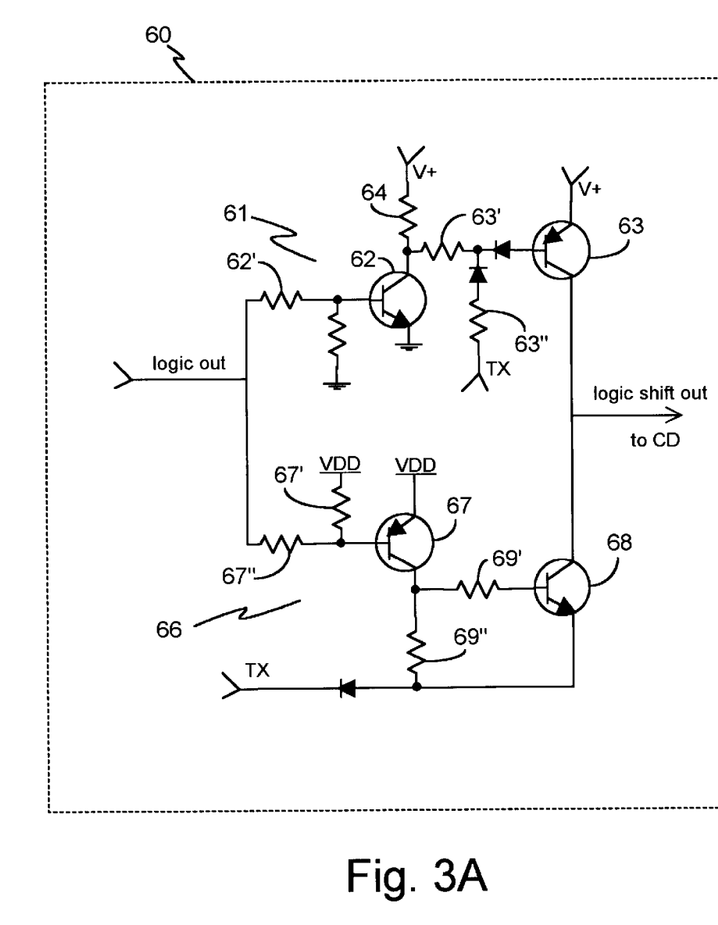

Logic-level shifter circuit 60 typically shifts the logic voltage output signals of the +5 volts and 0 volts output of counter circuit 50 to the voltage levels supported by the computer (±12 volts, but typically values are in the ±9 volts range) through the CD terminal of serial port interface 20. Referring now to FIG. 3A, logic-level shifter circuit 60 includes a V+ driven circuit 61 and a VDD driven circuit 66 coupled in parallel. V+ driven circuit 61 further includes an NPN transistor 62 having a base coupled to logic output terminal 52 of counter circuit 50 through resistor 62', and a PNP transistor 63 having a base coupled to the collector of NPN transistor 62 through resistor 63'. The collector of NPN transistor 62 is also coupled to V+ through resistor 64 and to the TX terminal of serial port interface 20. The emitter of NPN transistor 62 is coupled to ground. PNP transistor 63 has the emitter coupled to V+ and the collector coupled to the CD terminal of serial port interface 20. The VDD driven circuit 66 further includes a PNP transistor 67 and an NPN transistor 68. The base of PNP transistor 67 is coupled to VDD and to logic output terminal 52 throught resistors 67' and 67", respectively. The emitter of PNP transistor 67 is coupled to VDD and the collector is coupled to the TX terminal of serial port interface and the emitter of NPN transistor 68 through resistor 69". The collector of PNP transistor 67 is also coupled to the base of NPN transistor 68 through resistor 69'. The collector of NPN transistor 68 is coupled to the CD terminal of serial port interface 20.

Illustrated in FIG. 3, calibration and measuring circuit 70 includes three sub-circuits connected in series with each other, a calibration circuit 71, a first probe circuit 74, and a second probe circuit 77. It should be understood by those skilled in the art that the calibration and measuring circuit 70 may have a plurality of probe sub-circuits for use with a plurality of measuring probes. Calibration circuit 71 further includes a resistor 72 connected to the collector and the base of calibration transistor 73. Calibration circuit 71 is used to determine a temperature correction factor, if needed, to compensate for the circuit temperature of adapter 10. First probe circuit 74 includes a first probe 90' (not shown) connected in series at coupling points P1 with a first probe resistor 75 which is connected to the collector and base of first probe transistor 76. Second probe circuit 77 includes a second probe 90" (not shown) connected in series at coupling points P2 with second probe resistor 78 which is connected to the collector and base of second probe transistor 79. Each of the emitters of calibration transistor 73, first probe transistor 76 and second probe transistor 79 is connected to control circuit 85.

The frequency of the circuit of adapter 10 depends on the VDD voltage, the capacitor 44, the resistors 80, 72, 75, and 78, the measuring probes 90, and the temperature of the circuit. The frequency of the PLL output is temperature dependent. The effects are nulled by operating the circuit using a known resistance (resistor 72). Control circuit 85 determines whether an initialization, a calibration (circuit temperature compensation) or a measurement is performed. Control circuit 85 includes a first control NAND gate 86, a second control NAND gate 87 and a third control NAND gate 88. Control circuit 85 is connected to the DTR terminal of the serial port interface through control resistor 89. Control circuit 85 electronically determines which sub-circuits of calibration and measuring circuit 70 are active. The output of gate 86 is coupled to the emitter of calibration transistor 73 and to one of two inputs of each gate 87 and gate 88. The output of gate 87 is coupled to the emitter of first probe transistor 76 and to the second of two inputs of gate 88. The second input of gate 87 is coupled to logic output terminal 52. The output of gate 88 is coupled to the emitter of second probe transistor 79. It should be understood by those skilled in the art that any means for allowing the flow of current through the respective sub-circuits may be used. As example, diodes may be substituted in place of calibration transistor 73, first probe transistor 76 and second probe transistor 79 without affecting the functionality of the present invention.

During a calibration cycle, the host computer holds DTR active (high). This disables control gates 87 and 88 so that first probe transistor 76 and second probe transistor 79 are off. The computer then reads the number of counts to generate a logic 1-0 and 0-1 transition with the known resistor (calibration resistor 72). The application program then adjusts the temperature readings by an amount proportional to the error in reading the known resistor (calibration resistor 72) in both states. During a measurement cycle, the logic output terminal 52 of counter circuit 50 changes logic state whenever a full count is reached. The calibration and measuring circuit 70 uses the logic state of the logic output terminal 52 in conjunction with control gates 87 and 88 to control which measuring probe is being read. When DTR is low, control gates 87 and 88 operate as inverters. When the logic output terminal 52 is high, the output of control gate 87 is low which makes the output of control gate 88 high disabling current through second probe transistor 79 and the second measuring probe, and allowing current to flow through control gate 87 and the first probe transistor 76 and the first measuring probe. When the logic output terminal 52 is low, first probe transistor 76 is disabled and current flows through control gate 88 and second probe transistor 79 and the second measuring probe. The measuring probe circuit portion of calibration and measuring circuit 70 will necessarily change depending on the type of measurements being made and use of the proper required circuits are well known by those skilled in the art of making those particular measurements.

Figure 4:
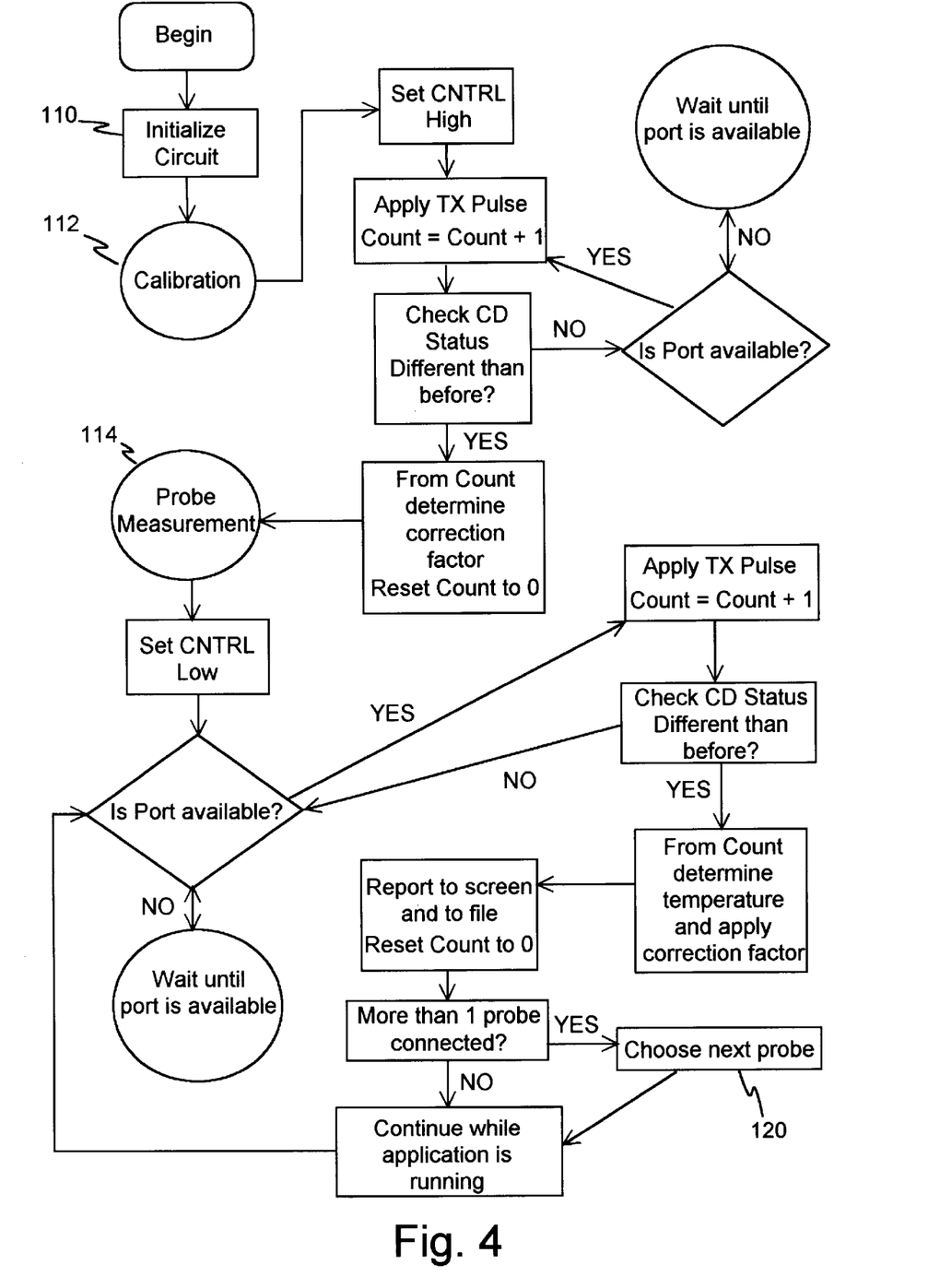
FIGS. 4 and 5 are flow charts illustrating execution of tasks on a preferred adapter system.
Figure 5:
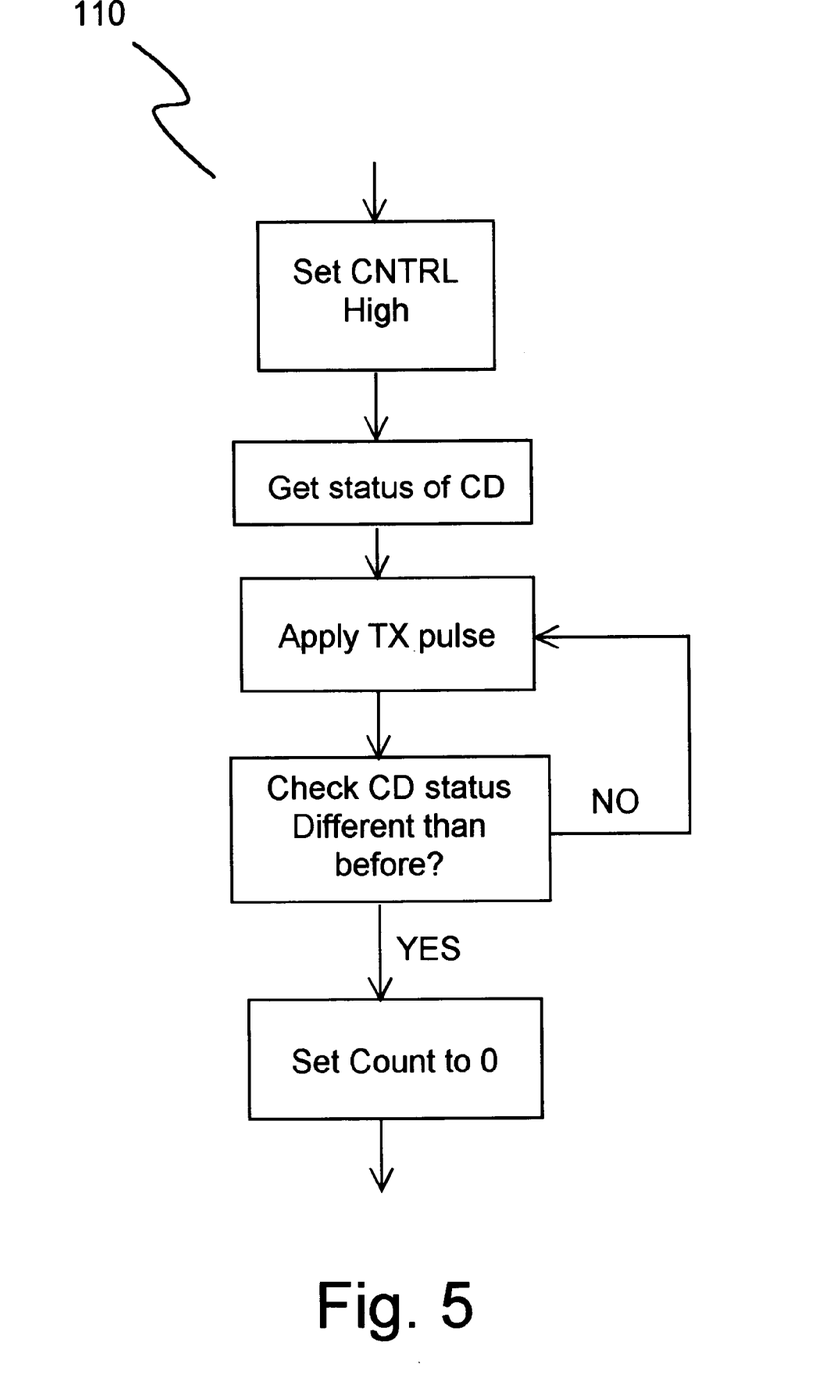

FIGS. 4 and 5 are flow charts illustrating the typical operation of the present invention for using the serial port of a computer in polling mode for measuring temperature. To use the present invention, a user connects an embodiment of the present invention to a computer's serial communications port and boots up the system. For first time users, the application program must be installed on the host computer. Anytime after initial installation, the user then begins the application program. Operation of the present invention proceeds as follows and as illustrated in FIGS. 4 and 5. At step 110 in FIG. 4, the adapter 10 is initialized. This is more clearly illustrated by FIG. 5. The initialization process is used to set the TX pulse counter in the program to zero. This is done by the program in the following way. The program sets CNTRL high (DTR) which, as previously explained, chooses calibration circuit 71 of adapter 10. The status of CD (logic high or logic low) is obtained and stored. A TX pulse is applied allowing the frequency of frequency output lead 41 of converter 42 to be received by the clock lead 51 of counter circuit 50. The pulse width of the TX pulse is equal to one divided by the baud rate times 9 (p=1/(br×9), where p is the pulse width and br is the baud rate) The counter circuit 50 is set to divide down the frequency by $2^{19}$. The status of CD is checked. If the current status of CD has not changed from the status of the previous CD check, another TX pulse is applied. When the count in counter circuit 50 reaches full count, the status of the logic output signal changes which changes the status of CD. TX pulses are applied as long as the serial port is available. When the status of CD changes, the TX pulse counter count is set to 0. This puts the adapter 10 at a known starting point.

Following the initialization step 110, temperature calibration of the circuit of adapter 10 is performed next at step 112. As in initialization step 110, CNTRL is set high to choose the calibration circuit 71 of adapter 10. A TX pulse is transmitted, the TX pulse count is incremented by 1 and the status of CD is checked. If no change has occurred in the status of CD (the counter circuit 50 has not reached full count), the availability of the serial port is checked. If the serial port is not available because it is being used by the host computer for another device, the TX pulse count and the counter circuit 50 hold their count until the serial port becomes available. If and when the serial port becomes available, another TX pulse is applied to adapter 10. The TX pulse count is again incremented by 1 and the status of CD is checked. This loop continues until the status of CD changes. When the status of CD changes, the total TX pulse count is compared to a count preset value stored in a look-up table. The count preset value corresponds to a given operating temperature of the circuit of adapter 10. A correction factor is calculated based on the difference between the preset count and the total TX pulse count just performed. The TX pulse count is again reset to 0. Because the frequency of the converter circuit 40 is temperature dependent, a correction factor is determined for applying to the values obtained from the measuring probes 90. This correction factor compensates for the temperature at which the circuit of adapter 10 is operating. For the preferred embodiment of the present invention, the correction factor, which is a multiplier, is used to calculate the corrected temperature reading from a temperature probe. The equation is $$T_{corr} = \frac{C_{std}}{C_{meas}} \times T_{meas}$$

where $T_{meas}$=the temperature reading obtained from a temperature probe $C_{std}$=the preset count for the circuit at a temperature of 50° F.

$C_{meas}$=the measured count for the circuit during calibration $T_{coor}$=the corrected temperature reading After initialization and calibration, probe measurements represented by step 114 can then be performed. CNTRL is now set low which chooses one of the measuring probe circuits, first probe circuit 74 or second probe circuit 77. The measuring probe circuit chosen is dependent on the state of the logic output terminal 52 of counter circuit 50. Serial port availability is checked. If the serial port is not available, the application program waits until the port is available and all counts are held, i.e. the TX pulse count and the count in the counter circuit 50. If and when the serial port is available, a TX pulse is applied to adapter 10, and again, as before for the calibration cycle (step 112), the TX pulse count is incremented by 1 every time a TX pulse is applied. Following each TX pulse, CD status is checked and compared to the CD status when the previous TX pulse was applied. If unchanged, the loop of checking for port availability and applying another TX pulse continues until CD status changes. When CD status changes, the total TX pulse count is compared to the entries of a preset look-up table for the type of measuring probe being used. For this embodiment, the TX count is converted to a temperature reading and the circuit temperature correction factor is applied to determine the corrected temperature reading. The corrected reading is reported to the screen and saved to a file. If more than one temperature probe is used as the measuring device, the next temperature probe is chosen (step 120) by the control circuit 85 in conjunction with the state of the logic output of counter circuit 50, as explained previously. The process continues making temperature measurements and alternates between the temperature probes while the application is running.

Depending on the measuring device or devices used, the application program will contain the proper look-up table for the conversion of total counts to the particular measurement value, i.e. degrees Fahrenheit or Celsius for temperature probes, inches of mercury or millimeters of mercury or torr for pressure probes, miles per hour for wind speed measurements, and the like.

Although the preferred embodiment of the present invention has been described herein, the above description is merely illustrative. Further modification of the invention herein disclosed will occur to those skilled in the respective arts and all such modifications are deemed to be within the scope of the invention as defined by the appended claims.

What is claimed is:

1. A communications port adapter for using a communications port of a host computer in polling mode, said communications port adapter comprising:

a converter circuit having at least a converter input and a converter output, said converter input coupled to a measuring means for receiving an output signal from said measuring means, said converter circuit converting said output signal to a frequency signal, said frequency signal having a frequency parameter proportional to the output signal of said measuring means, and transmitting said frequency signal through said converter output;

a switching means coupled to said converter output; and a counter circuit having at least a counter input and a counter output, said counter input coupled to said converter output through said switching means, said counter input receiving and storing said frequency signal from said converter output when a signal pulse is transmitted without the use of interrupts from said communications port of said host computer and transmitting at said counter output a logic status signal through said communications port to said host computer when said counter circuit changes logic status.

2. The adapter of claim 1 further comprising a logic-level shifter circuit coupled to said counter output and said communications port wherein said logic-level shifter circuit conditions said logic status signal of said counter output.

3. The adapter of claim 1 further comprising a power regulating circuit coupled to a power connection of said communications port, said converter circuit and said counter circuit, wherein said power regulating circuit provides a substantially constant voltage to said adapter.

4. The adapter of claim 3 wherein said substantially constant voltage is about +5 volts.

5. The adapter of claim 1 wherein said measuring means comprising a temperature calibration circuit coupled to said converter input.

6. The adapter of claim 5 further comprising a control circuit coupled to said communications port, said temperature calibration circuit and said counter circuit.

7. The adapter of claim 6 wherein said measuring means further comprising at least one measuring circuit coupled to said control circuit and said converter input.

8. The adapter of claim 6 wherein said control circuit has at least a first control gate means having at least a first control gate means output and a pair of first control gate means inputs coupled to said communications port, and a second control gate means having a second control gate means output and a pair of second control gate means inputs wherein one of said second control gate means inputs is coupled to said first control gate means output and said calibration circuit and the other of said second control gate means inputs is coupled to said counter output.

9. The adapter of claim 1 wherein said switching means comprising at least a first switching means input, a second switching means input and a switching means output, said first switching means input coupled to said communications port, said second switching means input coupled to said converter output, and said switching means output coupled to said counter input.

10. The adapter of claim 1 wherein said counter circuit divides downs said frequency signal by $2^{19}$.

11. A communications port apparatus for use with a communications port of a host computer, said communications port being used in polling mode without interrupts, said apparatus comprising:

a converter means connected to a measuring device for producing a frequency signal, said frequency signal having a frequency parameter proportional to the output signal of said measuring device;

a switching means operatively responsive to a pulse signal from said host computer and connected to the output of said converter means for transmitting said frequency signal of said converter means; and a counter means having at least a counter means input connected to said switching means for receiving said frequency signal and a counter means output for supplying a logic output signal of said counter means to said communications port when the logic status of said counter means changes.

12. The apparatus of claim 11 further comprising a calibration and measuring means having at least a calibration circuit and a measuring circuit connected in parallel to the input of said converter means.

13. The apparatus of claim 12 further comprising a control means for activating said calibration means and said measuring means, said control means having at least a first control gate means connected in series to a second control gate means wherein said first control gate means is coupled to said calibration circuit and wherein said second control gate means is coupled to said measuring circuit.

14. The apparatus of claim 11 further comprising a power regulating means coupled to said converter means and said counter means wherein said power regulating means supplies power to said converter means and said counter means.

15. A method of using a communications port of a host computer in polling mode with an attached communications port adapter, said method comprising:

initializing said attached communications port adapter;

receiving an input signal from a measuring means connected to a converter means of said attached communications port adapter, said measuring means having one or more measuring devices attached thereto;

converting said input signal to a frequency signal;

transmitting said frequency signal to a counter means of said communications port adapter when said attached communications port adapter receives a signal pulse from said communications port of said host computer;

counting the number of signal pulses transmitted until a counter of said counter means changes logic status; and detecting said logic status change of said counter.

16. The method of claim 15 further comprising converting said count of said signal pulse to a measurement value of said measuring device.

17. The method of claim 15 wherein said initializing step comprising:

setting a control connection of said communications port high for selecting a calibration means of said adapter;

obtaining the status of a carrier detect connection of said communications port wherein said carrier detect connection is coupled to the output of said counter means;

transmitting a signal pulse to said attached communications port adapter;

counting the number of signal pulses transmitted until a counter of said counter means is full;

detecting a logic status change from said counter means when said counter is full; and setting said counter of said signal pulses to 0.

18. The method of claim 15 further comprising a temperature compensation calibration step, said step comprising:

setting a control connection of said communications port high for selecting a calibration means of said communications port adapter;

obtaining the status of a carrier detect connection of said communications port wherein said carrier detect connection is coupled to the output of a counter means of said communications port adapter;

transmitting a signal pulse to said attached communications port adapter;

counting the number of signal pulses transmitted until a counter of said counter means is full;

detecting a logic status change transmitted from said counter means to said carrier detect connection when said counter is full;

comparing the count of the total number of signal pulses transmitted to a preset value stored in a reference look-up table;

calculating a multiplier based on the ratio of the preset value to the count of the total number of signal pulses; and resetting said counter of said signal pulses to 0.

19. The method of claim 15 further comprising holding the count of said signal pulses and said counter of said counter means when said communications port of said host computer in unavailable.

20. The method of claim 15 further comprising switching between measuring devices coupled to said measuring means when said measuring means has at least two measuring devices attached and when said logical status change is detected.

21. The method of claim 15 further comprising resetting the count of the signal pulses and the count of the counter means to 0.

22. A program product comprising:

a computer usable medium having computer readable program code means embodied therein for using a communications port of a host computer in polling mode and without interrupts, said computer readable program code means in said program product comprising:

computer readable program code means for causing the computer to effect checking the availability of said communications port;

computer readable program code means for causing the computer to effect initializing a communications port adapter connected to said communications port when said communications port is available;

computer readable program code means for causing the computer to effect calibrating a communications port adapter when said communications port is available;

computer readable program code means for causing the computer to effect selecting a measuring probe attached to said communications port adapter; and computer readable program code means for causing the computer to effect comparing a measurement value received from said communications port adapter to a corresponding value stored in a reference look-up table for said measuring probe, said measurement value being proportional to an output signal of said measuring probe.

23. The program product of claim 22 wherein said step of initializing said communications port adapter further includes:

setting a control connection of said communications port high for selecting a calibration means of said communications port adapter;

obtaining the status of a carrier detect connection of said communications port wherein said carrier detect connection is coupled to the output of a counter means of said communications port adapter;

transmitting a signal pulse to said communications port adapter;

counting the number of signal pulses transmitted until a counter of said counter means changes logic status;

detecting a logic status change of said counter; and setting said counter of said signal pulses to 0.

24. The program product of claim 22 wherein said step of calibrating said communications port adapter further includes:

setting a control connection of said communications port high for selecting a calibration means of said communications port adapter;

obtaining the status of a carrier detect connection of said communications port wherein said carrier detect connection is coupled to the output of a counter means of said communications port adapter;

transmitting a signal pulse to said communications port adapter;

counting the number of signal pulses transmitted until a counter of said counter means changes logic status;

detecting a logic status change of said counter;

comparing the count of the total number of signal pulses transmitted to a preset value stored in a reference look-up table;

calculating a multiplier based on the ratio of the preset value to the count of the total number of signal pulses; and resetting said counter of said signal pulses to 0.

25. The program product of claim 24 further comprising the step of calculating a corrected measurement value by multiplying said corresponding value of said measurement value received from said communications port adapter and stored in said reference look-up table with said multiplier.

26. The program product of claim 22 wherein the step of selecting a measuring probe further includes:

setting a control connection of said communications port low for selecting one of at least one or more measuring probes attached to said communications port adapter;

transmitting a signal pulse to said communications port adapter;

counting the number of signal pulses transmitted until a counter of said counter means changes logic status;

detecting a logic status change of said counter;

saving said count of the total number of signal pulses transmitted as a measurement value; and resetting said counter of said signal pulses and said counter of said counter means to 0.

* * * * *